Patented June 27, 1944

2,352,199

UNITED STATES PATENT OFFICE 3,352,199

PRODUCTION OF TOLUENE

Vladimir N. Ipatieff and George S. Monroe, Chicago, Ill., assignor to Universal Oil Products Company, Chicago, Ill., a corporation of Delaware No Drawing. Application May 24, 1941,
Serial No. 395,054

13 Claims. (Cl. 260—671)

This invention relates to the production of toluene by interaction of benzene and methane in the presence of a catalyst. More specifically it is concerned with the conversion of benzene into substantial yields of toluene and diphenyl in the presence of a dehydrogenating catalyst.

It is recognized that benzene has been converted into toluene and more-highly methylated benzenes by treatment with methyl chloride in the presence of aluminum chloride catalyst. Methyl chloride so employed as a methylating agent must be prepared synthetically and is more expensive than methane, the relatively abundant gaseous paraffinic hydrocarbon utilized in the process of the present invention which employs a dehydrogenating catalyst to assist in removing hydrogen and effecting combination between benzene and methane.

In one specific embodiment the present invention comprises a process for producing toluene which comprises contacting benzene with methane in the presence of a dehydrogenating catalyst at a temperature of from about 350° to about 750° C.

Suitable catalysts for use in effecting the process of the present invention comprise essentially composites of refractory carriers with compounds, particularly oxides or sulfides, of elements selected from the members of the left-hand column of group VI of the periodic table consisting of chromium, molybdenum, tungsten, and uranium. Refractory carriers utilizable in the production of the aforementioned dehydrogenating catalyst composites comprise alumina, magnesia, silica, thoria, etc., as such or mixed with one another and employed for supporting a compound of a group VI element. The indicated carriers or supports which are not necessarily equivalent in their action may be obtained by a number of methods, some of which are hereinafter set forth.

In regard to the production of alumina which is generally preferable as a carrier or support for the preparation of catalysts suitable for the process of this invention, it may be stated that three hydrated oxides of aluminum occur in nature, to wit, hydrargillite or gibbsite, bauxite, and diaspore. Of these three minerals the corresponding oxides from the trihydrated and dihydrated minerals are suitable for the manufacture of the present types of catalysts and these materials have furnished types of activated alumina which are entirely satisfactory. Precipitated trihydrates can also be dehydrated at moderately elevated temperatures to form satisfactory types of alumina. Crystallographically and X-ray spectroscopically, this most satisfactory type of alumina is referred to as gamma-alumina crystallizing in the cubic system, the length of edge of the unit cube being about 7.9 angstrom units. Alumina in the form of powdered corundum or prepared by dehydrating diaspore is not as suitable.

It is best practice in the final steps of preparation of aluminum oxides for use in the catalyst composites to ignite them for some time at temperatures within the approximate range of 500° to 600° C. This does not correspond to complete dehydration of the hydrated oxides but gives catalytic materials of good strength and porosity so that they are able to resist for a long time the deteriorating effects of the service and the reactivation periods to which they are subjected.

Magnesia may be prepared by controlled calcination of natural magnesite which is commonly encountered in a massive or earthy variety and rarely in crystalline form, the crystals usually being rhombohedral. In many natural magnesites, the magnesium oxide may be replaced to the extent of several per cent by ferrous oxide. The mineral is of quite common occurrence and readily obtainable in quantity at a reasonable figure. The pure compound begins to decompose to form the oxide at a temperature of 350° C., though the rate of decomposition only reaches a practical value at considerably higher temperatures, usually of the order of 800° to 900° C. Magnesite is related to dolomite, the mixed carbonate of calcium and magnesium, the latter mineral, however, not being of as good service as the relatively pure magnesite in the present instance. Magnesium carbonate prepared by precipitation or other chemical methods may be used alternatively in place of the natural mineral. It is not necessary that the magnesite be completely converted to oxide but as a rule it is preferable that the conversion be at least over 90%, that is, so that there is less than 10% of the carbonate remaining in the ignited material.

Silica suitable for compositing with activating oxides to produce catalysts may be obtained conveniently by precipitating silica gel from a solution of a water soluble silicate by the addition of an aqueous solution of a mineral acid followed by washing to remove water soluble salts and drying to produce a granular material comprising essentially silica.

Thoria utilized in the production of dehydrogenating catalysts may be obtained by known methods from a number of minerals including thorite, orangite, and thorianite.

The catalytic efficiencies of the above indicated carriers are improved greatly by the presence of oxides of the preferred elements in amounts up to approximately 50% of the weight of the total composite catalyst. These oxides which constitute the principal active catalytic materials may be deposited upon the surface and in the pores of the carrier granules by several alternative methods such as, for example, the ignition of nitrates which have been absorbed or deposited on the carriers from aqueous solution by evaporation or by similar ignition of precipitated hydroxides. As an alternative method though sometimes less preferable the finely divided oxides may be composited mechanically with the carrier granules either in the wet or in the dry condition. The point of achieving the most uniform practical distribution of the oxides on the carrier granules should be borne in mind constantly since the observed catalytic effects evidently depend principally on surface action.

The oxides of the activating elements comprising the members of the left-hand column of group VI of the periodic table and some of the changes which they undergo are indicated in the following paragraphs.

The element chromium has three oxides, the trioxide, the dioxide, and the sesquioxide, the last named being readily produced by heating the trioxide in hydrogen or in hydrocarbon vapors at a temperature of 250° C. The dioxide has been considered to be an equimolecular mixture of the trioxide and the sesquioxide. These oxides may be developed readily on the surfaces and in the pores of carrier granules by utilizing primarily solutions of chromic acid or chromium nitrate. The ignition of chromic acid, the nitrate, or the precipitated trihydroxide produces primarily the trioxide which is then reduced to the sesquioxide to furnish an active catalyst for use in reactions of the present character.

The two most important oxides of molybdenum which may be employed alternatively in the production of catalysts of the present type are the dioxide and the sesquioxide. Since the reduction of the trioxide by hydrogen begins at about 300° C. and the reduction is rapid at 450° C., the effective catalyst material is principally the sesquioxide. The trioxide may be added to the carrier from a solution in aqueous ammonia or from a solution of ammonium molybdate which is added in an amount just requisite to wet the carrier granules uniformly, and the mass is then dried and calcined.

The element tungsten has three oxides: the trioxide, the dioxide, and the sesquioxide. The trioxide is readily soluble in aqueous ammonia from which it may be deposited upon active carrier granules and it is ordinarily reduced preliminary to service by the action of hydrogen at a red heat. Tungstic acids may be heated to drive off water and leave a residue of oxides on the carrier particles.

In regard to uranium, which is the heaviest member of the present natural group of elements whose oxides are preferred as catalysts, it may merely be stated that while this element furnishes catalytic oxides having some order of catalytic activity, its scarcity and cost naturally preclude its extensive use in practice.

In effecting reaction between benzene and methane according to the process of the present invention the exact method of procedure and operating conditions employed vary with the proportions of the reacting constituents as well as with the composition and activity of the catalyst used. The different catalysts which may be employed are thus not necessarily equivalent in their action.

The procedure preferably utilized for effecting methylation of benzene according to the process of this invention consists in passing a mixture of benzene and a molar excess of methane over a fixed bed of dehydrogenating catalyst maintained at a temperature of from about 350° to about 750° C. under a pressure of from about 50 to about 450 atmospheres. The reaction mixture undergoing treatment preferably contains between about 2 and about 20 molecular proportions of methane per 1 molecular proportion of benzene in order to favor production of toluene and to diminish the reactions which result in formation of diphenyl and alkylated diphenyl which are valuable products although not the preferred products of the present process.

While the method of passing methane and benzene either together or countercurrently through a suitable reactor containing a fixed bed of granular dehydrogenating catalyst is generally customary procedure, interaction of methane and benzene may also be effected in batch type of operation in which the catalyst is present in finely divided form and is preferably maintained in dispersion or suspension by some means of agitation.

In general the products formed during treatment of mixtures of benzene and methane with a dehydrogenating catalyst are separated from unreacted benzene and methane by suitable means as by distillation and the unreacted portions of the benzene and methane are recycled and commingled with additional quantities of these hydrocarbons being charged to contact with the catalyst. Hydrogen or hydrogen-containing gases produced in the process may also be recycled with the recovered benzene and methane. The reaction product boiling higher than benzene is separated into desired fractions or individual compounds including toluene and diphenyl by distillation at ordinary or reduced pressure or by other suitable means. From the reaction products it is generally possible to separate certain amounts of more-highly methylated benzenes and some alkylated diphenyl derivatives.

The following examples are given to illustrate the character of results obtained by the use of the present process, although the data presented are not introduced with the intention of unduly limiting the generally broad scope of the invention.

*Example I*

71 parts by weight of powdered molybdenum trioxide and 71 parts by weight of powdered alumina were intimately mixed with 4% by weight of graphite and formed into 3x3 mm. cylindrical pellets by means of a pelleting machine. The formed particles were then heated in a stream of hydrogen for 16 hours at 225° C.

The alumina-molybdenum oxide particles so prepared were then used as a filler in a steel reactor through which a mixture of methane and benzene was passed at 566° C. under 234 atmospheres pressure during a period of 5 hours while the benzene was charged at an hourly rate corresponding to 0.4 volume of liquid per volume of catalyst. Methane was charged simultaneously at such a rate that the molecular ratio of methane to benzene was approximately 8. Upon the basis of the weight of benzene consumed in the process, the yields of toluene and diphenyl were 26.8% and 52.3% respectively.

In a similar run in the presence of the above described catalyst at 533° C. under 290 atmospheres pressure, the yields of toluene and diphenyl corresponded to 16% and 28%, respectively, of the weight of benzene consumed in the reaction.

Another run in the presence of alumina at 571° C. yielded 11.9% of toluene, 5.6% of higher-methylated benzenes, and 60.7% of diphenyl, these respective yields being based upon the weight of benzene consumed. In a similar run in which the reactor was packed with porcelain beads the respective yields of toluene and diphenyl were 12.4 and 55.7% by weight based upon the benzene consumed.

The above indicated results show that in the presence of the dehydrogenating catalyst the production of 1 mole of toluene was accompanied by formation of about 2 moles of diphenyl, while in the presence of porcelain beads or of alumina alone, which have much lower dehydrogenating activities, approximately 5 moles of diphenyl accompanied the formation of 1 mole of toluene. The presence of molybdenum oxide with the alumina was therefore beneficial in increasing the production of toluene over that obtained in the presence of the alumina catalyst carrier.

Example II

A similar run was made on a mixture of 1 molecular proportion of benzene and 6.7 molecular proportions of methane in the presence of 144 parts by weight of a composite formed from 50% by weight of molybdenum trioxide, 30% by weight of alumina, and 20% by weight of silica following the method of preparing pelleted catalyst described in Example I. During a run of 3 hours at 567° C. under 234 atmospheres pressure, the liquid products recovered, based upon the weight of benzene originally charged, consisted of 2.2% of toluene, 0.2% of higher methylated benzene, 3.0% of diphenyl, and 84.3% of benzene. Upon the basis of the benzene consumed the yields of toluene and diphenyl were 14 and 19.1% by weight. A similar run carried out in the presence of 3x3 mm. cylindrical pellets of silica yielded 14.1% of toluene and 58.4% of diphenyl based upon the weight of benzene consumed.

Example III

A catalyst was made by mixing equal parts by weight of chromium sesquioxide and alumina which had been calcined at 500° C., further mixing the powdered material with 4% by weight of hydrogenated cocoanut oil (the latter to serve as a lubricant for the pelleting machine), forming into 3x3 mm. cylindrical pellets by a pelleting machine, calcining at 550° C., and thereafter heating in hydrogen for 16 hours at 225° C.

The catalyst so formed was used as filler in a steel reactor at a temperature of 567° C. under a pressure of 234 atmospheres while charging 8 molecular proportions of methane per 1 molecular proportion of benzene, the latter being fed at an hourly rate corresponding to 0.37 volume for volume of catalyst. During a run of 3.5 hours while the average time of contact of the reactants was about 198 seconds, the reaction product obtained per pass over the catalyst, based upon the weight of benzene charged, consisted of 2.6% toluene, 0.2% higher methylated benzenes, 6.6% diphenyl, and 88.7% unconverted benzene suitable for recycling together with the unconverted gaseous products containing methane. Upon the basis of the weight of benzene consumed, the reaction product consisted of 23.4% toluene, 1.7% higher methylated benzenes, and 58.3% of diphenyl.

Example IV

A catalyst consisting of 12% by weight of chromium sesquioxide, 2.1% by weight of magnesium oxide, and 85.9% by weight of alumina was formed by impregnating 3x3 mm. cylindrical pellets of alumina with a solution of chromic acid and magnesium chromate of suitable concentration to give a composite of the above analysis. The impregnated pellets were calcined for 6 hours at 700° C., then cooled to 225° C., and reduced with hydrogen at that temperature for 19 hours.

Approximately 112 parts by weight of the above described catalyst was used as a filler in a steel reactor through which was passed a mixture of 8 molecular proportions of methane, and 1 molecular proportion of benzene at an average catalyst temperature of 568° C. under a pressure of 234 atmospheres, the average time of contact being calculated as approximately 200 seconds. During this treatment the benzene was charged at an hourly rate of 0.35 volume per volume of reactor containing the catalyst layer while the methane charging rate was approximately 753 volumes per hour. Upon the basis of the weight of benzene charged, the liquid products recovered contained 3.3% toluene, 6.6% diphenyl, and 89.3% of unconverted benzene suitable for recycling together with the recovered gaseous products comprising essentially unconverted methane. The respective yields of toluene and diphenyl were 30% and 62% by weight of the benzene consumed in the reaction.

The character of the process of the present invention and particularly its commercial value are evident from the preceding specification and examples given, although neither section is intended to unduly limit its generally broad scope.

We claim as our invention:

1. A process for producing a substantial yield of toluene which comprises subjecting benzene and methane to contact at a temperature of from about 350° to about 750° C. under a pressure between about 50 and about 450 atmospheres in the presence of a dehydrogenating catalyst.

2. A process for producing a substantial yield of toluene which comprises subjecting benzene and methane to contact at a temperature of from about 350° to about 750° C. under a pressure between about 50 and about 450 atmospheres in the presence of a dehydrogenating catalyst comprising essentially a composite of a refractory carrier and a compound of an element of the left-hand column of group VI of the periodic table.

3. A process for producing a substantial yield of toluene which comprises subjecting benzene and methane to contact at a temperature of from about 350° to about 750° C. under a pressure between about 50 and about 450 atmospheres in the presence of a dehydrogenating catalyst comprising essentially a composite of an alumina-containing carrier and a compound of an element of the left-hand column of group VI of the periodic table.

4. A process for producing a substantial yield of toluene which comprises subjecting benzene and methane to contact at a temperature of from about 350° to about 750° C. under a pressure between about 50 and about 450 atmospheres in the presence of a dehydrogenating catalyst comprising a compound of an element of the left-hand column of group VI of the periodic table.

5. A process for producing a substantial yield of toluene which comprises subjecting benzene and methane to contact at a temperature of from about 350° to about 750° C. under a pressure between about 50 and about 450 atmospheres in the presence of a dehydrogenating catalyst comprising an oxide of an element of the left-hand column of group VI of the periodic table.

6. A process for producing a substantial yield of toluene which comprises subjecting 1 molecular proportion of benzene and from about 2 to about 20 molecular proportions of methane to contact at a temperature of from about 350° to about 750° C. under a pressure between about 50 and about 450 atmospheres in the presence of a dehydrogenating catalyst comprising essentially a composite of an alumina-containing carrier and a compound of an element of the left-hand column of group VI of the periodic table.

7. A process for producing a substantial yield of toluene which comprises subjecting 1 molecular proportion of benzene and from about 2 to about 20 molecular proportions of methane to contact at a temperature of from about 350° to about 750° C. under a pressure between about 50 and about 450 atmospheres in the presence of a dehydrogenating catalyst comprising essentially a composite of an alumina-containing carrier and an oxide of chromium.

8. A process for producing a substantial yield of toluene which comprises subjecting 1 molecular proportion of benzene and from about 2 to about 20 molecular proportions of methane to contact at a temperature of from about 350° to about 750° C. under a pressure between about 50 and about 450 atmospheres in the presence of a dehydrogenating catalyst comprising essentially a composite of an alumina-containing carrier and an oxide of molybdenum.

9. A process for the production of toluene which comprises subjecting a mixture of benzene and a molar excess of methane to the action of a dehydrogenating catalyst at a temperature of from about 350° C. to about 750° C. and under a pressure in the approximate range of 50–450 atmospheres.

10. The process as defined in claim 9 further characterized in that said catalyst comprises an oxide of an element from the left-hand column of group VI of the periodic table.

11. A process for the production of toluene which comprises subjecting a mixture of benzene and a molar excess of methane to the action of a chromia-containing catalyst at a temperature of from about 350° to about 750° C. and under a pressure in the approximate range of 50–450 atmospheres.

12. A process for the production of toluene which comprises subjecting a mixture of benzene and a molar excess of methane to the action of a catalyst comprising alumina and chromia at a temperature of from about 350° C. to about 750° C. and under a pressure in the approximate range of 50–450 atmospheres.

13. A process for the production of toluene which comprises subjecting a mixture of benzene and a molar excess of methane to the action of a catalyst comprising alumina and molybdena at a temperature of from about 350° C. to about 750° C. and under a pressure in the approximate range of 50–450 atmospheres.

VLADIMIR N. IPATIEFF.
GEORGE S. MONROE.